United States Patent
Hashimoto et al.

(10) Patent No.: US 9,692,348 B2
(45) Date of Patent: Jun. 27, 2017

(54) MOTOR CONTROL DEVICE THAT DETECTS OVERLOAD

(71) Applicant: FANUC CORPORATION, Yamanashi (JP)

(72) Inventors: Shoutarou Hashimoto, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/932,365

(22) Filed: Nov. 4, 2015

(65) Prior Publication Data
US 2016/0134227 A1 May 12, 2016

(30) Foreign Application Priority Data

Nov. 7, 2014 (JP) ................. 2014-227484

(51) Int. Cl.
| | | |
|---|---|---|
| H02P 7/00 | (2016.01) | |
| H02P 29/02 | (2016.01) | |
| H02P 6/00 | (2016.01) | |
| H02P 21/14 | (2016.01) | |
| H02H 7/085 | (2006.01) | |
| B62D 5/04 | (2006.01) | |
| B23Q 11/04 | (2006.01) | |

(52) U.S. Cl.
CPC ........... H02P 29/021 (2013.01); H02H 7/085 (2013.01); H02P 6/001 (2013.01); H02P 21/148 (2013.01); B23Q 11/04 (2013.01); B62D 5/046 (2013.01); B62D 5/0463 (2013.01); H02P 29/02 (2013.01); Y02T 10/642 (2013.01)

(58) Field of Classification Search
CPC ..... B62D 5/0463; B62D 5/046; Y02T 10/642; Y02T 10/7005; B60W 10/08; H02P 29/02

USPC .......................................... 318/432
See application file for complete search history.

(56) References Cited

U.S. PATENT DOCUMENTS

| | | | | |
|---|---|---|---|---|
| 2003/0163286 A1* | 8/2003 | Yasugi | ............... | G05B 19/4065 702/185 |
| 2007/0052383 A1* | 3/2007 | Abe | ................... | G05B 19/4062 318/651 |
| 2007/0216330 A1* | 9/2007 | Kawakura | .............. | H02H 3/006 318/432 |

FOREIGN PATENT DOCUMENTS

| | | |
|---|---|---|
| CN | 1759356 A | 4/2006 |
| CN | 101051744 A | 10/2007 |
| CN | 202550486 U | 11/2012 |

(Continued)

OTHER PUBLICATIONS

English Abstract and machine translation for Japanese Publication No. 05-116094 A, published Oct. 17, 2003, May 14, 1993, 13 pgs.

(Continued)

*Primary Examiner* — Kawing Chan
*Assistant Examiner* — Bradley Brown
(74) *Attorney, Agent, or Firm* — Fredrikson & Byron, P.A.

(57) ABSTRACT

A motor control device includes a load torque estimation unit configured to estimate a load torque applied to a motor, a torque comparison unit configured to compare the load torque with a reference torque, a time measurement unit configured to measure a time span during which the load torque is higher than the reference torque, a time comparison unit configured to compare the time span with a reference time, and a decision unit configured to decide that the motor is subjected to an excessive load when the time span exceeds the reference time.

4 Claims, 5 Drawing Sheets

(56) References Cited

FOREIGN PATENT DOCUMENTS

| JP | 5116094 A | 5/1993 |
|---|---|---|
| JP | 5169347 A | 7/1993 |
| JP | 2003080529 A | 3/2003 |
| JP | 2007270607 A | 10/2007 |
| JP | 2013196572 A | 9/2013 |

OTHER PUBLICATIONS

English Abstract and machine translation for Japanese Publication No. 2003-080529 A, published Mar. 19, 2003, 15 pgs.
English Translation of Japanese Publication No.2013196572, published Sep. 30, 2013, 14 pages.
English Translation of Japanese Publication No. 2007270607, published Oct. 18, 2007, 16 pages.
English Abstract and Machine Translation for Japanese Publication No. 05-169347 A, published Jul. 9, 1993, 6 pgs.
English Abstract and Machine Translation for Chinese Publication No. 202550486 U, published Nov. 21, 2012, 6 pgs.
English Abstract and Machine Translation for Chinese Publication No. 101051744 A, published Oct. 10, 2007, 8 pgs.
English Abstract and Machine Translation for Chinese Publication No. 1759356 A, published Apr. 12, 2006, 10 pgs.

\* cited by examiner

FIG. 5

TYPE OF PROCESSING $TO_{11}$   $TO_{12}$ ............ $TO_{1n}$
$TO_{21}$
...
$TO_{m1}$ ............................ $TO_{mn}$

TYPE OF TOOL

FIG. 6

TYPE OF PROCESSING $C1_{11}$   $C1_{12}$ ............ $C1_{1n}$
$C1_{21}$
...
$C1_{m1}$ ............................ $C1_{mn}$

TYPE OF TOOL

MOTOR CONTROL DEVICE THAT DETECTS OVERLOAD

BACKGROUND OF THE INVENTION

1. Field of Invention

The present invention relates to a motor control device that detects an overload imposed on a motor.

2. Description of Related Art

When a main axis that drives a cutting tool of a machine tool is successively subjected to an excessive load, the main axis may be damaged. Therefore, it is common to monitor the load torque imposed on a motor that rotates the main axis. When the load torque exceeds a reference value, the motor is stopped so as to prevent the main axis from being damaged.

Japanese Laid-open Patent Publication No. 5-116094 discloses a technique to obtain an estimated disturbance torque from a disturbance estimation observer, and to output an alarm when the estimated disturbance torque exceeds a reference value. In addition, Japanese Laid-open Patent Publication No. 2003-80529 discloses a technique to output an alarm and stop the motor, when the detected load torque exceeds a predetermined upper limit or lower limit.

In this regard, when the cutting tool starts to cut a workpiece, the load torque imposed on the motor driving the main axis momentaneously increases. In such a case, the load torque imposed when the cutting is started exceeds the reference value, and therefore the motor should be stopped.

In other words, when the reference value is set to a lower value, the load torque may exceed the reference value since the load torque increases at the time that the cutting is started. Accordingly, it is desirable to disregard the excessive load that momentaneously arises in such a case, to thereby continue the operation of the machine tool.

The present invention has been accomplished in view of the aforementioned situation, and provides a motor control device configured to stop the motor only when the motor is successively subjected to an excessive load.

SUMMARY OF THE INVENTION

In a first aspect, the present invention provides a motor control device including a load torque estimation unit configured to estimate a load torque applied to a motor on a basis of a current flowing through the motor and velocity of the motor, a torque comparison unit configured to compare the load torque estimated by the load torque estimation unit with a reference torque, a time measurement unit configured to measure a time span during which the load torque is higher than the reference torque, a time comparison unit configured to compare the time span measured by the time measurement unit with a reference time, and a decision unit configured to decide that the motor is subjected to an excessive load when the time span exceeds the reference time as result of comparison by the time comparison unit.

In a second aspect, the present invention provides the motor control device according to the first aspect, in which the motor serves to drive a main axis of a machine tool.

In a third aspect, the present invention provides the motor control device according to the second aspect, further including a motor status decision unit configured to decide a status of the motor, and a setting unit configured to set the reference time depending on the status of the motor decided by the motor status decision unit.

In a fourth aspect, the present invention provides the motor control device according to the third aspect, in which the setting unit is configured to set at least one of the reference time and the reference torque, depending on a type of processing to be performed by the machine tool.

In a fifth aspect, the present invention provides the motor control device according to the third or the fourth aspect, in which the setting unit is configured to set at least one of the reference time and the reference torque, depending on a type of tool attached to the main axis of the machine tool.

These and other objects, features, and advantages of the present invention will become more apparent through detailed description given hereunder on typical embodiments of the present invention, with reference to the accompanying drawings.

BRIEF DESCRIPTION OF DRAWINGS

FIG. 5 is a diagram representing a map of reference torques; and

FIG. 6 is a diagram representing a map of first predetermined values of reference time.

DETAILED DESCRIPTION

Figure 1:
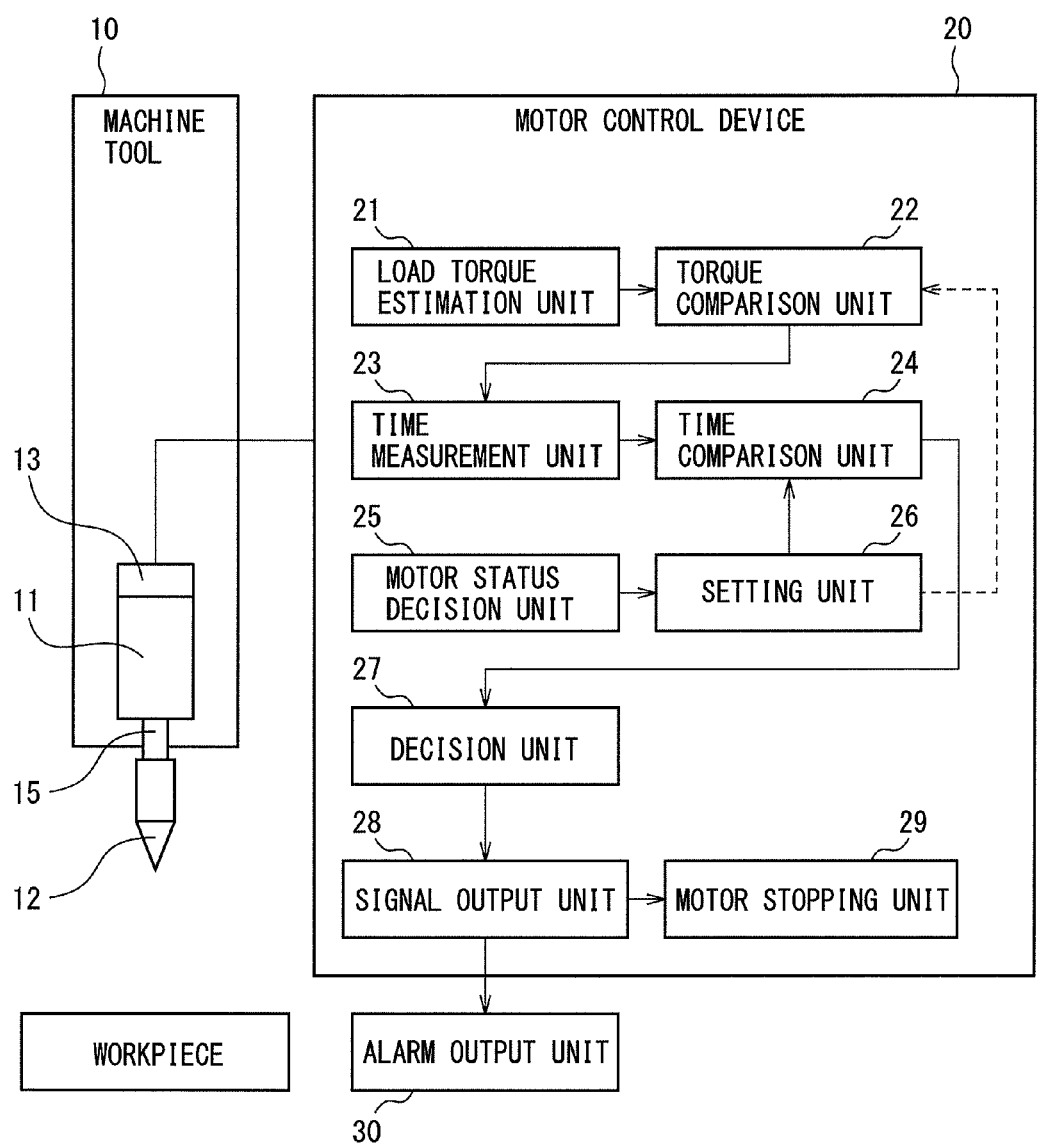
FIG. 1 is a block diagram of a motor control device according to the present invention.

Hereafter, embodiments of the present invention will be described with reference to the accompanying drawings. In the drawings, the same constituents have the same numeral. For clearer understanding, the scale of the constituents may be modified in the drawings.

FIG. 1 is a block diagram of a motor control device according to the present invention. As illustrated in FIG. 1, a machine tool 10 includes a main axis motor 11 that drives a tool 12 attached to a main axis 15. When the motor 11 drives the tool 12, a workpiece is processed, for example cut. The motor 11 also includes a detection unit 13. The detection unit 13 serves as a current sensor for detecting a current flowing through the motor 11, and as a velocity sensor that calculates the velocity of the motor 11 from the rotation speed thereof.

The motor control device 20 is a digital computer connected to the machine tool 10 so as to control the machine tool 10. As illustrated in FIG. 1, the motor control device 20 includes a load torque estimation unit 21 configured to estimate a load torque T applied to the motor 11 on the basis of the current flowing through the motor 11 and the velocity thereof detected by the detection unit 13. The estimation of the load torque T may be performed by a known method, and hence detailed description will be omitted.

The motor control device 20 also includes a torque comparison unit 22 configured to compare the load torque T estimated by the load torque estimation unit 21 with a reference torque T0, a time measurement unit 23 configured to measure a time span C during which the load torque T is higher than the reference torque T0, a time comparison unit 24 configured to compare the time span C measured by the time measurement unit 23 with a reference time C0. The reference torque T0 and the reference time C0 are stored in a non-illustrated storage unit of the motor control device 20.

Referring further to FIG. 1, the motor control device 20 also includes a decision unit 27 configured to decide that the motor 11 is subjected to an excessive load when the time span C exceeds the reference time C0 as result of comparison by the time comparison unit 24, a signal output unit 28 configured to output an overload signal when the decision unit 27 decides that the motor 11 is subjected to the excessive load torque, and a motor stopping unit 29 configured to stop the motor 11 when the signal output unit 28 outputs the overload signal. Further, as can be seen from FIG. 1, an alarm output unit 30, configured to output an alarm when the signal output unit 28 outputs the overload signal, is connected to the motor control device 20.

Still further, the motor control device 20 includes a motor status decision unit 25 configured to decide the status of the motor 11, i.e., whether the motor 11 is in operation for the processing or not, and a setting unit 26 configured to set the reference time C0 depending on the status of the motor 11 decided by the motor status decision unit 25. The setting unit 26 is also configured to set at least one of the reference time C0 and the reference torque T0 depending on the type of the processing to be performed by the machine tool 10, and/or the type of the tool 12 attached to the main axis 15 of the machine tool 10.

Figure 2:
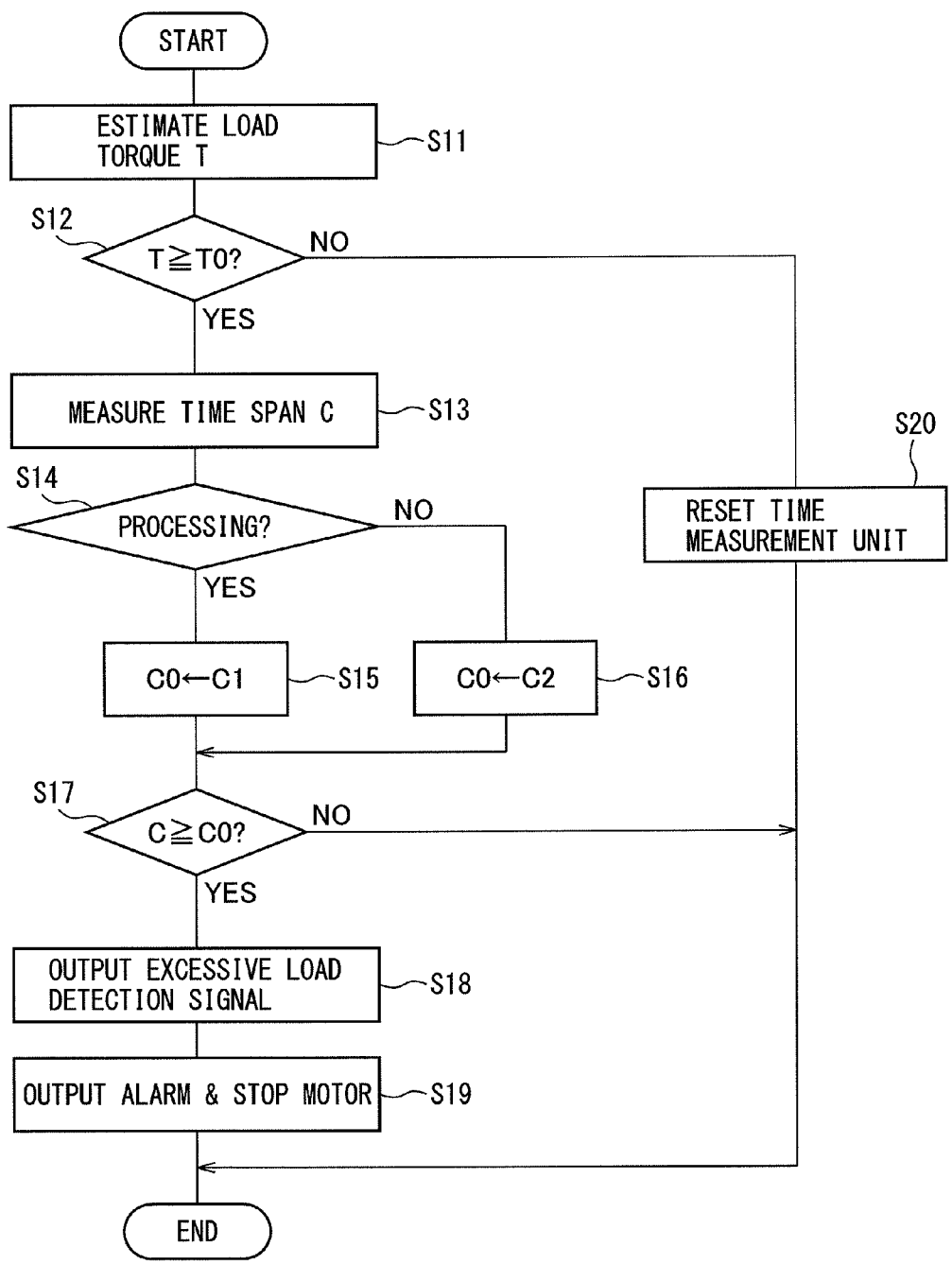
FIG. 2 is a flowchart representing an operation of the motor control device according to a first embodiment of the present invention.
Figure 3:
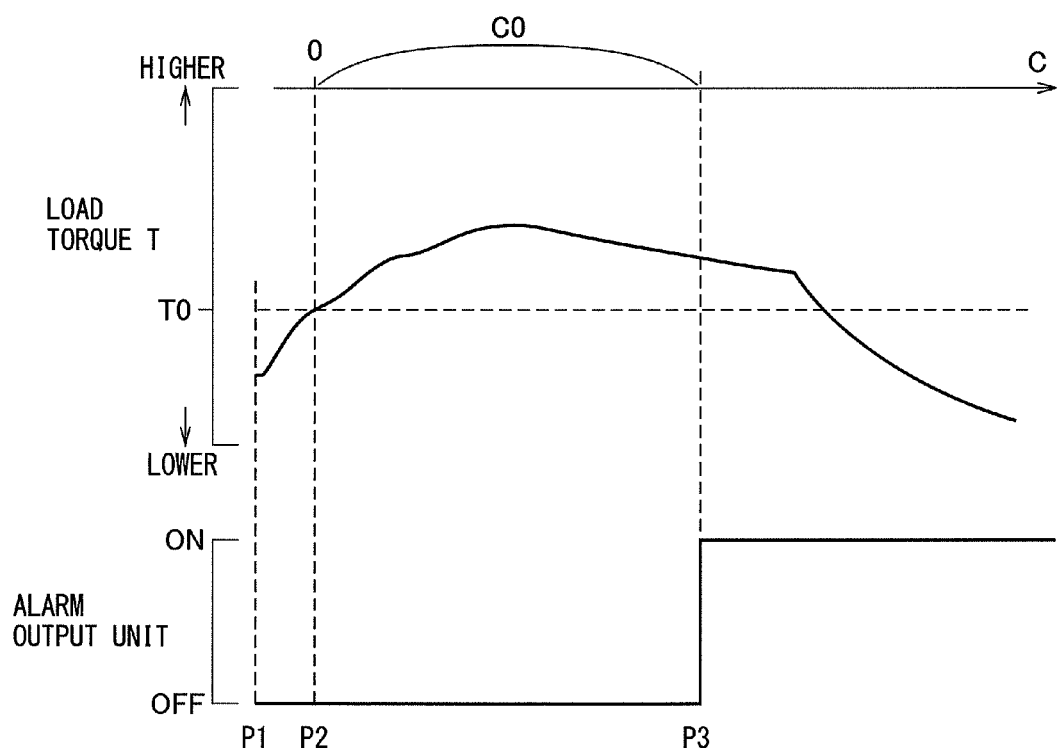
FIG. 3 is a time chart representing a relation between a load torque and an alarm output unit.

FIG. 2 is a flowchart representing an operation of the motor control device according to a first embodiment of the present invention. FIG. 3 is a time chart representing a relation between the load torque T and the alarm output unit. Referring to FIG. 1 to FIG. 3, the operation of the motor control device according to a first embodiment of the present invention will be described hereunder. It will be assumed that the operation of the motor control device represented in FIG. 2 is repeatedly performed at a predetermined control period. Although the following description refers to the case where the tool 12 is used to cut the workpiece, it is to be understood that the present invention is not limited to the cutting process.

First, at step S11 in FIG. 2, the load torque estimation unit 21 acquires the current and the velocity of the motor 11 from the detection unit 13, and estimates the load torque T applied to the motor 11. Then the torque comparison unit 22 decides whether the load torque T is equal to or higher than the reference torque T0, at step S12.

Referring to FIG. 3, the load torque T is lower than the reference torque T0 at a time point P1 where the machine tool 10 has started the operation, as indicated by a solid line. For example, the reference torque T0 may be 10% higher than the load torque T at the time point P1. Upon reaching a time point P2, the load torque T becomes equal to or higher than the reference torque T0.

Under such a state, the time measurement unit 23 starts to measure the time span C, during which the load torque T is equal to or higher than the reference torque T0 (step S13). When the load torque T is lower than the reference torque T0, the operation proceeds to step S20, where the time span C is reset.

At step S14 in FIG. 2, the motor status decision unit 25 decides the status of the motor 11, i.e., whether or not the motor 11 is in operation for the processing. When the motor 11 is in operation for the processing, the operation proceeds to step S15, where the setting unit 26 sets a first predetermined value C1 as reference time C0.

In contrast, when the motor 11 is not in operation for the processing, the operation proceeds to step S16, where the setting unit 26 sets a second predetermined value C2 as reference time C0. The first predetermined value C1 is larger than the second predetermined value C2, for example the first predetermined value C1 may be 100 ms and the second predetermined value C2 may be 10 ms.

At step S17, the decision unit 27 decides whether the time span C during which the load torque T is equal to or higher than the reference torque T0 is equal to or longer than the reference time C0. Referring here to FIG. 3, the time span C which started to be measured at the time point P2 reaches the reference time C0 at a time point P3. When the time span C is longer than the reference time C0 as in this case, the operation proceeds to step S18, where the signal output unit 28 outputs the overload signal. When the time span C is shorter than the reference time C0, the operation is finished.

At step S19, the overload signal outputted as above is provided to the motor stopping unit 29 and the alarm output unit 30. The motor stopping unit 29 stops the motor 11, to thereby prevent the main axis 15, the tool 12, and the workpiece from being damaged. In addition, the alarm output unit 30 outputs the alarm as illustrated in FIG. 3, so as to call the attention of the operator.

Conventionally, the motor 11 is stopped when it is decided that the load torque T is higher than the reference torque T0 at step S12. In the present invention, in contrast, it is decided that an excessive load torque T is successively arising when the time span C during which the load torque T is higher than the reference torque T0 exceeds the reference time C0, in which case the motor 11 is stopped.

In other words, in the present invention the motor 11 is stopped only when the excessive load torque T successively arises, so as to prevent the main axis 15, the tool 12, and the workpiece from being damaged. In the present invention, the motor 11 can be continuously driven when there is excessive load torque T only for a brief period of time or momentaneously.

In the present invention, further, the reference time C0 is modified to the first predetermined value C1, or the second predetermined value C2 shorter than the first predetermined value C1, depending on whether the motor 11 is in operation for the processing or not. The reference time C0 is set to the first predetermined value C1, which is relatively longer, while the motor 11 is in operation for the processing, and therefore the machine tool 10 can be continuously driven when there is excessive load torque T only for a brief period of time. If the excessive load torque successively arises, that the motor 11 is stopped.

While the motor 11 is not in operation, in contrast, the reference time C0 is set to the second predetermined value C2 which is relatively shorter. Accordingly, when there is excessive load torque for a brief period of time, for example upon feeding the workpiece, it is presumed that an excessive load torque has arisen because of, for example, collision of the machine tool 10 against a peripheral apparatus, and the motor 11 is immediately stopped. Such an arrangement prevents the main axis 15, the tool 12, and the workpiece from being damaged.

Figure 4:
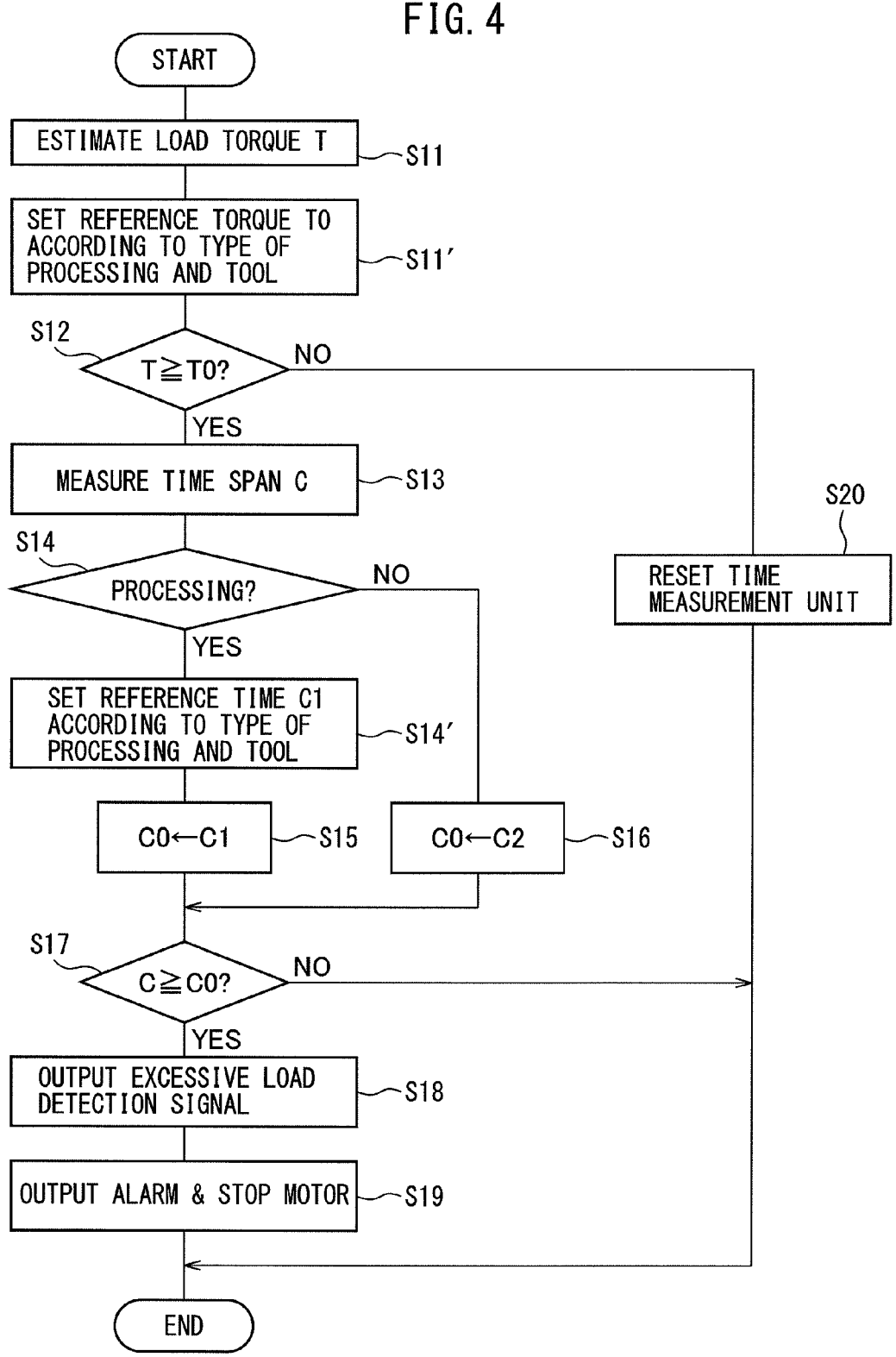
FIG. 4 is a flowchart representing an operation of the motor control device according to a second embodiment of the present invention.

FIG. 4 is a flowchart representing an operation of the motor control device according to a second embodiment of the present invention. FIG. 5 is a diagram representing a map of the reference torque T0, and FIG. 6 is a diagram representing a map of the first predetermined value C1 as variation of the reference time C0. Referring to FIG. 4 to FIG. 6, the operation of the motor control device according to the second embodiment of the present invention will be described hereunder. For the sake of simplicity, the description of the same steps as those of the first embodiment will not be repeated.

Referring to FIG. 4, in the second embodiment the setting unit 26 sets the reference torque T0 according to the type of the processing and the type of the tool 12 at step S11', between step S11 and step S12. As illustrated in FIG. 5, the reference torque T0 is determined in advance as a function of the type of the processing and the type of the tool 12, and stored in a map form in the non-illustrated storage unit of the motor control device 20. Examples of the type of the processing include cutting, perforating, polishing, and grinding. Examples of the tool 12 include a cutting tool, a perforating tool, a polishing tool, and a grinding tool. The reference torque T0 set at step S11' is compared with the load torque T at step S12.

Further, at step S14' between step S14 and step S15, setting unit 26 sets the first predetermined value C1 according to the type of the processing and the type of the tool 12. As illustrated in FIG. 6, the first predetermined value C1 is determined in advance as a function of the type of the processing and the type of the tool 12, and stored in a map form in the non-illustrated storage unit of the motor control device 20. The first predetermined value C1 set at step S14' is regarded as the reference time C0, and the reference time C0 is compared with the time span C at step S17.

As described above, the reference time C0 (first predetermined value C1) and the reference torque T0 can be modified according to the type of the processing and the type of the tool 12, in the present invention. Thus, the present invention enables execution of a more appropriate control based on the type of the processing and the type of the tool 12.

EFFECT OF THE INVENTION

With the configuration according to the first aspect, it is decided that the excessive load has successively arisen when the time during which the load torque is higher than the reference torque exceeds the reference time. Therefore, the motor can be continuously driven when there is excessive load for a brief period of time.

With the configuration according to the second aspect, the main axis of the machine tool, the tool attached to the main axis, and the workpiece processed by the main axis are prevented from being damaged.

With the configuration according to the third aspect, the reference time can be modified depending on the status of the motor, i.e., whether the motor is in operation for the processing or not. Therefore, when there is excessive load torque for a brief period of time, an appropriate measure can be taken according to the status of the motor.

With the configuration according to the fourth aspect, the reference time and the reference torque can be modified according to the type of the processing, which facilitates execution of more appropriate control.

With the configuration according to the fifth aspect, the reference time and the reference torque can be modified according to the type of the tool, which facilitates execution of more appropriate control.

Although the present invention has been described with reference to typical embodiments, it is obvious to those skilled in the art that various modifications, omissions, and additions may be made without departing from the scope and spirit of the present invention.

What is claimed is:

1. A motor control device comprising:
    a load torque estimation unit configured to estimate a load torque applied to a motor on a basis of a current flowing through the motor and velocity of the motor;
    a torque comparison unit configured to compare the load torque estimated by the load torque estimation unit with a reference torque;
    a time measurement unit configured to measure a time span during which the load torque is higher than the reference torque;
    a time comparison unit configured to compare the time span measured by the time measurement unit with a reference time;
    a decision unit configured to decide that the motor is subjected to an excessive load when the time span exceeds the reference time as result of comparison by the time comparison unit, a motor status decision unit configured to decide a status of the motor; and
    a setting unit configured to set the reference time depending on the status of the motor decided by the motor status decision unit;
    wherein if the motor status decision unit decides that the motor is in operation for the processing, the setting unit sets a first predetermined value as reference time; and
    wherein if the motor status decision unit decides that the motor is not in operation for the processing, the setting unit sets a second predetermined value, which is smaller than the first predetermined value, as the reference time.

2. The motor control device according to claim 1, wherein the motor drives a main axis of a machine tool.

3. The motor control device according to claim 1, wherein the setting unit is configured to set at least one of the reference time and the reference torque, depending on a type of processing to be performed by the machine tool.

4. The motor control device according to claim 1, wherein the setting unit is configured to set at least one of the reference time and the reference torque, depending on a type of tool attached to the main axis of the machine tool.

* * * * *